(12) United States Patent
Perelli et al.

(10) Patent No.: US 6,749,215 B2
(45) Date of Patent: Jun. 15, 2004

(54) DOLLY HAVING MULTIPLE SUPPORTS HINGEDLY JOINED TOGETHER

(75) Inventors: Thomas Perelli, Winchester, VA (US); Craig J. Demko, Winchester, VA (US)

(73) Assignee: Rubbermaid Commercial Products LLC, Winchester, VA (US)

( * ) Notice: Subject to any disclaimer, the term of this patent is extended or adjusted under 35 U.S.C. 154(b) by 0 days.

(21) Appl. No.: 10/243,686

(22) Filed: Sep. 16, 2002

(65) Prior Publication Data

US 2003/0025303 A1 Feb. 6, 2003

Related U.S. Application Data

(62) Division of application No. 09/790,560, filed on Feb. 23, 2001.

(51) Int. Cl.$^7$ ................................................ B62B 3/02
(52) U.S. Cl. ........................................ 280/651; 16/350
(58) Field of Search ......................... 280/47.34, 47.35, 280/79.11, 79.2, 79.5, 639, 641, 651, 659; 16/231, 319, 350, 352, 327, 345

(56) References Cited

U.S. PATENT DOCUMENTS

| | | | |
|---|---|---|---|
| 1,213,538 A | * | 1/1917 | Raber .......................... 16/350 |
| 2,654,493 A | | 10/1953 | Kernkamp |
| 2,789,829 A | | 4/1957 | Parker |
| 3,025,985 A | | 3/1962 | Crawford |
| 3,031,207 A | | 4/1962 | Bard |
| 3,208,768 A | | 9/1965 | Hulbert |
| 3,858,899 A | | 1/1975 | Bontrager |
| 4,114,914 A | | 9/1978 | Cohen |
| 4,313,612 A | | 2/1982 | Rubens |
| 4,326,731 A | | 4/1982 | Woychio |
| 4,641,845 A | | 2/1987 | Hewitt |
| 4,985,962 A | * | 1/1991 | Weber .......................... 16/231 |
| 5,033,759 A | | 7/1991 | Wix |

(List continued on next page.)

FOREIGN PATENT DOCUMENTS

| | | | |
|---|---|---|---|
| DE | 1 071 492 | 12/1959 | |
| DE | 94 14 888 | 12/1994 | |
| FR | 1581331 | 9/1969 | |
| FR | 2421783 | 12/1979 | |
| GB | 810882 | 3/1959 | |
| GB | 1 058 591 | 2/1967 | |
| GB | 2 171 064 A | 8/1986 | |
| GB | 2178725 | * 2/1987 | .............. 280/79.11 |
| GB | 2180199 | * 3/1987 | ................. 280/651 |
| GB | 2 241 874 A | 9/1991 | |
| GB | 2 288 573 A | 10/1995 | |

OTHER PUBLICATIONS

Continental Catalog, Continental Manufacturing Company, "Huskee Trolley," p. 9.
Energy Recycling Co. Catalog, "CartX".
Waterloo Industries Catalog, Waterloo Recycling Systems, "Curbside Collection Carts".
Lab Safety Catalog, "Refuse Containers/Recycling Containers".

Primary Examiner—Frank Vanaman
(74) Attorney, Agent, or Firm—Foley & Lardner LLP (57) ABSTRACT

A dolly for transporting multiple containers. The dolly is provided with a plurality of casters which allow it to spin on its footprint. Supports, each of which can carry a container, are hinged together allowing the dolly to flex when encountering alterations in flooring level. Also provided are large side wheels which reduce the force necessary to push the dolly over a bump or onto a floor which is at a higher elevation. When one support is not carrying a container, the support can be rotated with the hinge to a point at which it is approximately perpendicular to the adjacent support and thereby approximately vertical to the floor. Rotating one support to an approximately vertical position shortens the dolly footprint and aids in storage. Moreover, a support which is rotated to an approximately vertical position can be temporarily maintained in that position by a lock.

9 Claims, 8 Drawing Sheets

U.S. PATENT DOCUMENTS

| | | |
|---|---|---|
| 5,052,703 A | 10/1991 | Bertrand |
| 5,074,572 A | 12/1991 | Delmerico et al. |
| 5,110,147 A | 5/1992 | Gershman |
| 5,181,731 A | 1/1993 | Gustavsen |
| D333,200 S | 2/1993 | Berrian |
| 5,184,836 A | 2/1993 | Andrews, Jr. et al. |
| 5,311,824 A * | 5/1994 | Sauer et al. ............. 16/231 |
| 5,445,397 A | 8/1995 | Evans |
| 5,556,118 A | 9/1996 | Kern et al. |
| 5,704,625 A | 1/1998 | Presnell et al. |
| 5,730,449 A | 3/1998 | Miles |
| 5,820,146 A | 10/1998 | Van Ligten |
| 5,860,659 A | 1/1999 | Hart |
| 5,911,424 A * | 6/1999 | Rovinsky ............. 280/79.11 |
| 5,913,528 A | 6/1999 | Kresse |
| 6,079,777 A | 6/2000 | Simmons et al. |
| 6,079,941 A | 6/2000 | Lee |
| 6,095,348 A | 8/2000 | Karashima |
| 6,129,366 A | 10/2000 | Dettmann et al. |
| D437,669 S | 2/2001 | Blason et al. |
| 6,443,481 B1 * | 9/2002 | Stravitz et al. ............. 280/651 |
| 6,454,050 B2 * | 9/2002 | Gibson et al. ............. 280/642 |
| 6,454,293 B1 | 9/2002 | Anderson |

\* cited by examiner

DOLLY HAVING MULTIPLE SUPPORTS HINGEDLY JOINED TOGETHER

CROSS-REFERENCE TO RELATED APPlICATION

This application is a division of U.S. application Ser. No. 09/790,560, filed Feb. 23, 2001.

BACKGROUND OF THE INVENTION

1. Field of the Invention

This invention relates to dollies having multiple supports and, in particular, to dollies with supports that are hingedly joined.

2. Description of the Related Art

Typically, dollies carrying a container comprise a wheeled platform to which a container is fixedly secured. For example, U.S. Pat. No. 5,074,572, which is incorporated herein by reference, issued to Delmerico et al. discloses a dolly which supports a single refuse container.

While dollies of this nature work well for their intended purpose, they have shortcomings. Often a user of such a dolly, such as a maintenance technician, is compelled to use multiple containers in performing his or her duties. For example, the technician may need one container to transport refuse and another container to transport recyclable goods. In addition, for those involved solely in recycling, different containers may be needed to transport each type of recyclable good (e.g., paper, plastic, glass, etc.). A single dolly transporting one container thus fails to satisfy the needs of these technicians.

U.S. Pat. No. 3,031,207 proposed a system in which two dollies could be connect by means of a pair of linking members. However, a rigid structure such as that disclosed in U.S. Pat. No. 3,031,207 lacks the ability to flex between the containers when one container is pulled (or pushed) onto a flooring which is at a different altitude (e.g., a threshold) whereas the other container remains on the previous flooring. U.S. Pat. No. 4,313,612 proposed a dolly system which inherently possesses the ability to flex slightly between containers. However, the system proposed in the U.S. Pat. No. 4,313,612 lacks the ability to temporarily rotate one support to an angle which is vertical approximately vertical with respect to the other horizontal support for purposes of storage. Of greater concern in the design of the system proposed in the U.S. Pat. No. 4,313,612 is the potential for the system to be disengaged when one container is pulled onto a flooring which is at higher altitude than the altitude of the flooring on which trailing containers (attached to the container being pulled) rest. This concern is warranted because the coupling therein may become disengaged when the leading container is lifted.

Some technicians have opted to string together multiple containers each of which is supported by a separate dolly. In stringing together the containers, the technicians often tie a handle of one container and to a handle on another container. The shortcomings with this solution are immediately apparent. First, the overall stability of the arrangement is poor. When pulling on a lead container, a trailing container may be prone to tipping when rounding a corner. Second, issues of sanitation are inherently present. For instance, when emptying the contents of a trash can into one of the containers, fluids and refuse may become trapped in whatever instrument is used to tie the containers together.

Accordingly, there is a need for a dolly transport system which is: (a) capable of transporting multiple containers; (b) capable of flexing between the containers when pulling one container onto a flooring with a different altitude; (c) stable and more maneuverable when rounding corners; (d) which provides the ability to rotate one platform with respect to an adjacent platform for storage purposes; and/or (e) which reduces or eliminates sanitation concerns.

SUMMARY

A solution to one or more of the aforementioned deficiencies in the art can be obtained by the dolly herein described.

One embodiment of the invention contemplates a dolly for transporting multiple containers having at least two supports each of which has a top surface and an underside, at least one wheel mounted to of each of said at least two supports and extending below the underside of each of said at least two supports, at least two support mechanisms for supporting containers to the top surfaces of said at least two supports, and a hinge. In this embodiment a first of the at least two supports is attached to a second of the at least two supports by the hinge. Moreover, the wheels mounted to extend below the undersides of the at least two supports are preferably casters. In this embodiment the hinge defines a pivot line along which at least one wheel is mounted; the axis of rotation of this wheel is preferably fixed with respect to the supports. A dolly according to the first embodiment can rotate 360° within a circle the diameter of which is the distance between an end of the first of said at least two supports and an end of the second of said at least two supports.

This embodiment contemplates adding a locking mechanism that allows the first support to be maintained at an angle with respect to the second support. Moreover, the support mechanisms include a first cylindrical boss which extends perpendicularly upward from the top surface of the first supports and has screw threads extending outwardly from the cylindrical boss. This embodiment may further incorporate a step point on which a user can place a foot to hold the dolly in a first fixed position when affixing a container to the dolly, and on which the user can place the foot to hold the dolly in a second fixed position when removing a container from the dolly.

A second embodiment of a dolly has at least two supports each having a top surface configured to receive a container and an underside, a first and a second of the supports being connected so as to be pivotable relative to one another about a pivot axis, a plurality of wheels, some of the wheels being connected to a first of the at least two supports and extending below the underside of the first of the at least two supports, some of the wheels being connected to a second of the at least two supports and extending below the underside of the second of the at least two supports, and at least one of the wheels being approximately coaxial with the pivot axis. In this embodiment, the first and the second supports are connected by a hinge which defines the pivot axis. Moreover, the second support bends toward the first support by means of being hingedly connected to the first support. This embodiment also contemplates adding a locking mechanism that allows the first support to be maintained at an angle with respect to the second support. In addition, and also similar to the first embodiment, the wheels mounted to extend below the undersides of the at least two supports are preferably casters allowing the dolly to rotate 360° within a circle the diameter of which is the distance between an end of the first support and an end of the second support.

The second embodiment may also include at least two support mechanisms for supporting at least two containers to the top surfaces of the at least two supports. The support mechanisms include a cylindrical boss which extends perpendicularly upward from the top surface of the supports and have screw threads extending outwardly from the cylindrical boss.

Finally, the second embodiment may include a step point on which a user can place a foot to hold the dolly in a first fixed position when affixing a container to the dolly, and on which the user can place a foot to hold the dolly in a second fixed position when removing a container from the dolly.

The invention also contemplates a method for storing multiple containers which includes removing a first container from a dolly which supports at least two containers, nesting the first container in a second container supported by the dolly, rotating a portion of the dolly which supported the first container toward a sidewall of second container, and storing the dolly. The method may also include locking the portion of the dolly which supported the first container in a position which defines an angle with respect to a second portion of the dolly which supports the second container. The angle is preferably between 75° and 105°.

Another invention of the present application includes a locking mechanism for use on a dolly which carries multiple containers. A locking mechanism of this nature includes a first hinge portion having a plurality of first fingers, each having at least one top beam and at least one bottom beam defining a first plurality of spaces, and a plurality of first support portions between each of the first fingers, a second hinge portion having a plurality of second fingers, each having at least one top beam and at least one bottom beam defining a second plurality of spaces, and a plurality of second support portions between each of the second fingers, a block attached to one of said first support portions, and a bar journalled through the plurality of first fingers and through the plurality of second fingers thereby joining the first hinge portion and the second hinge portion. In this locking mechanism, the first fingers are fixedly engaged with the second support portions and the second fingers are engaged with the first-pests support portions when the block is positioned in one of the said plurality of spaces. In addition, the first support portion to which the block is attached is preferably at an end of the first hinge portion. Finally, in the locked position, the block is frictionally engaged with one of said second fingers.

A structural understanding of the aforementioned dolly will be easier to appreciate when considering the detailed description in light of the figures hereafter described.

BRIEF DESCRIPTION OF THE DRAWINGS

The accompanying figures, which are incorporated in and constitute a part of the specification, illustrate presently preferred embodiments of the invention. Together with the above general description and the following detailed description, the figures serve to explain the principles of the invention.

DETAILED DESCRIPTION OF THE PREFERRED EMBODIMENT

Figure 1:
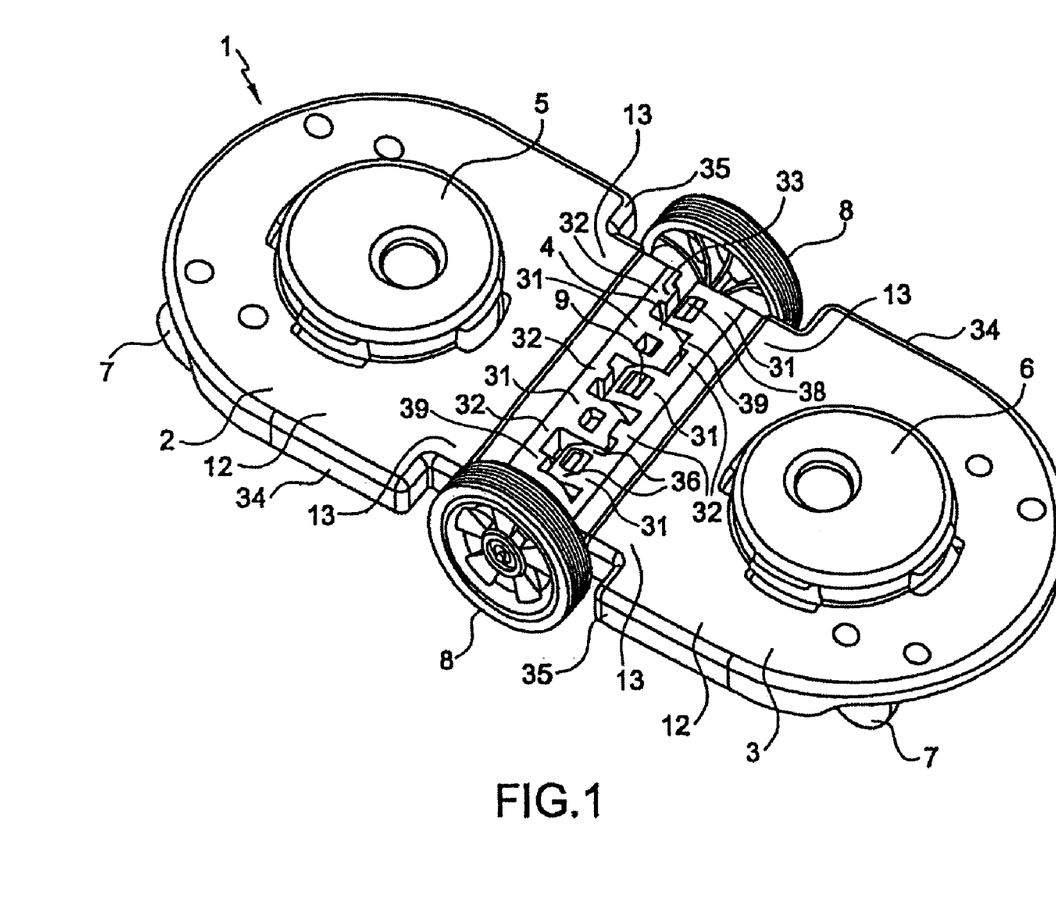
FIG. 1 is a topside perspective view of a dolly according to the present invention without containers affixed thereto.
Figure 2:
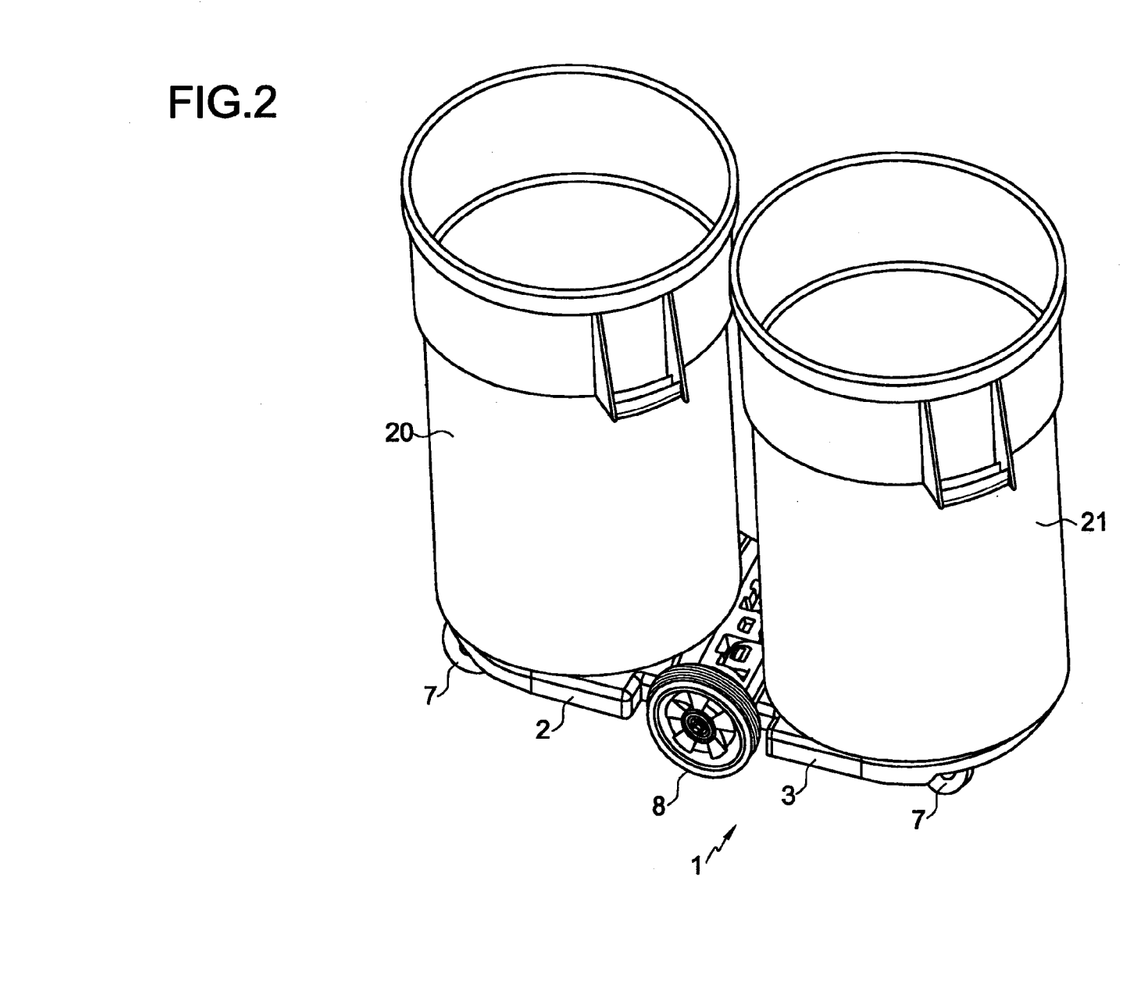
FIG. 2 is a topside perspective view of a dolly according to the present invention showing two containers affixed thereto.

FIG. 1 shows a dolly 1 according to a preferred embodiment of the present invention. The dolly 1 has two identical supports 2, 3 each of which supports a container 20, 21 (as shown in FIG. 2). Supports 2, 3 are interconnected by a hinge 4 through which a bar 9 is slotted. Each support 2, 3 has an support mechanism 5, 6 which is described in detail, infra, with respect to FIGS. 7–9. In between the support mechanisms exists numerous step points 13 on which a user can rest one of his feet when affixing a container 20, 21 to (or removing a container 20, 21 from) an support mechanism 5, 6.

Figure 3:
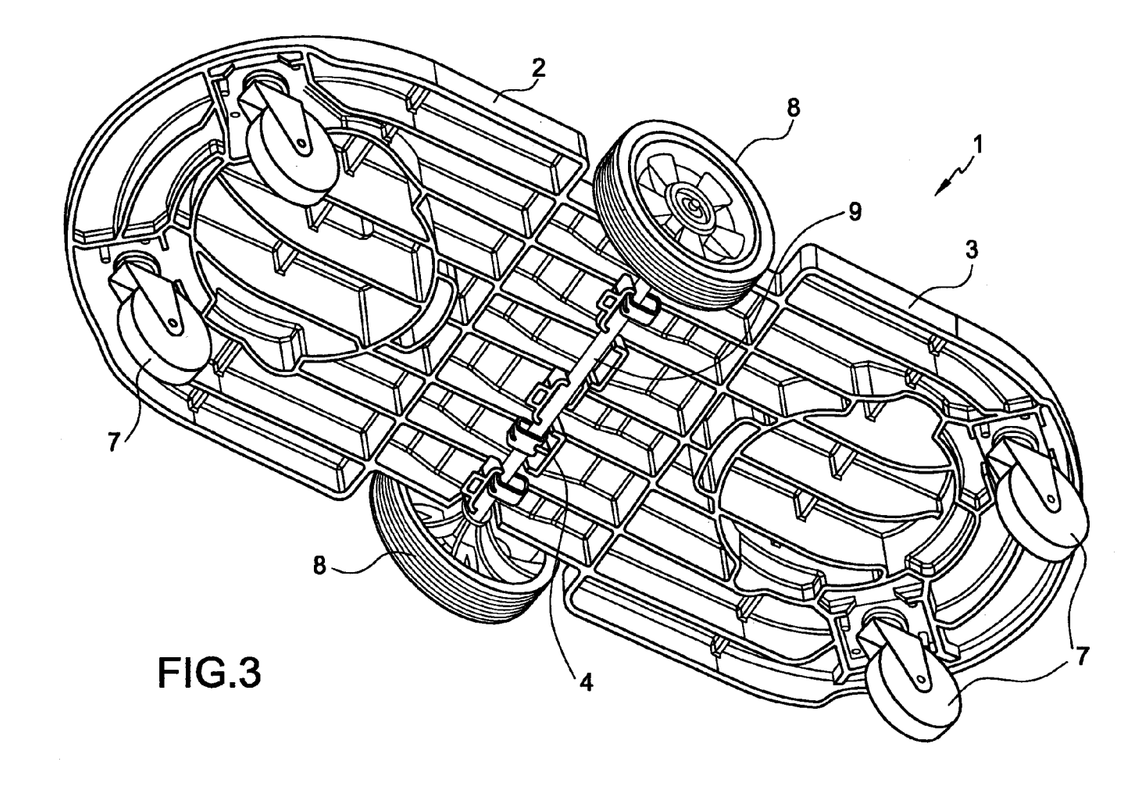
FIG. 3 is an underside perspective view of a dolly according to the present invention.

Positioned on an underside of the supports 2, 3 are a plurality of wheels 7 (shown best in FIG. 3) which are preferably casters. In addition, center wheels 8 are joined to the dolly 1 and are formed to rotate on a fixed axis of rotation defined by the bar 9. Essentially, the bar 9 serves as an axle for the wheels 8. Center wheels 8 provide support to the dolly 1 preventing it from sagging in a central portion thereof when one container 20, 21 is placed on one support 2, 3. In a preferred arrangement, the casters 7 are positioned so that the dolly 1 can rotate within a circle the diameter of which is the overall length of the dolly 1; such a rotation is possible by means of the casters 7 and center wheels 8. A rotation of this nature aids a user when maneuvering the dolly 1 in tight quarters.

Figure 4A:
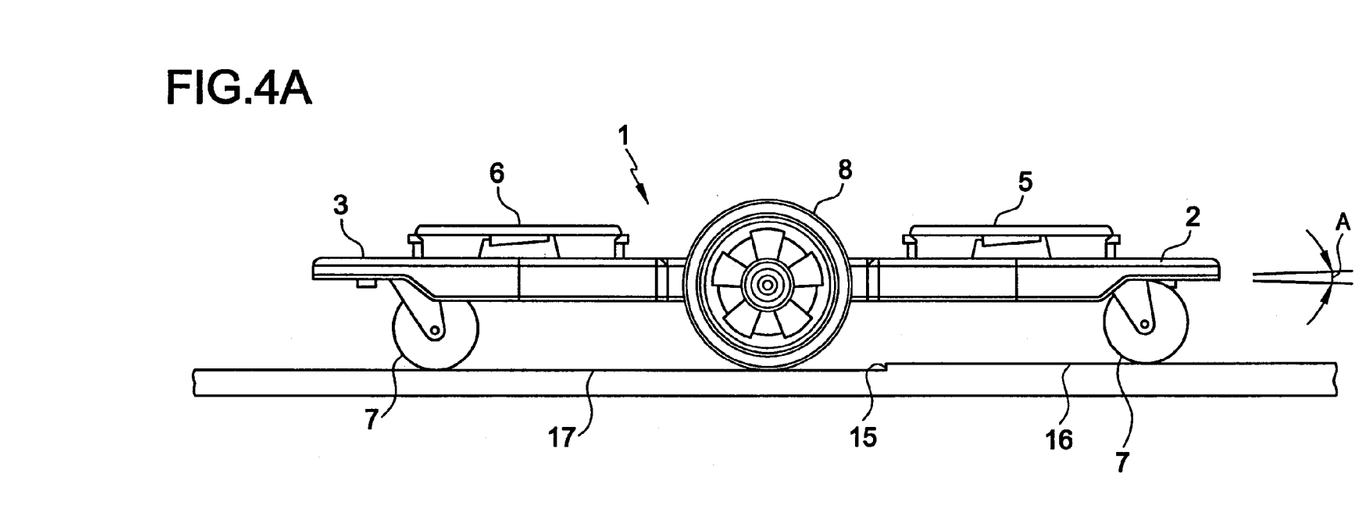
FIG. 4A is a side view of the dolly as one platform is pushed over a threshold and FIG. 4B is a side view of the dolly when the center wheels are pushed over the threshold.
Figure 4B:
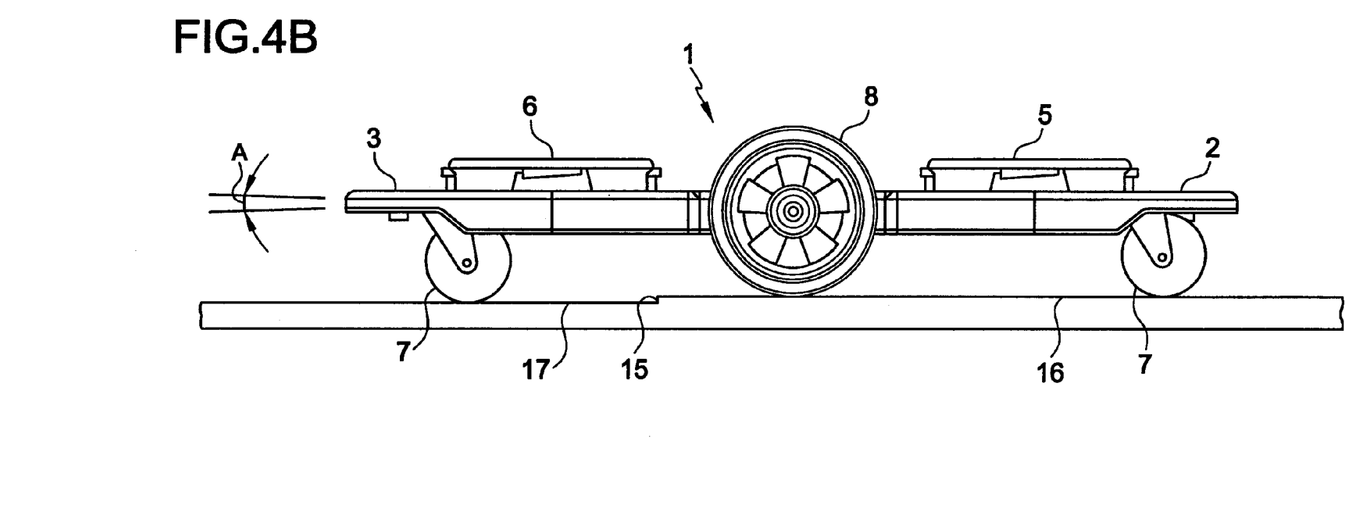

As shown in FIGS. 4A and 4B, the radius of the center wheels 8 is preferably larger than the radius of the wheels 7 formed into the undersides of the supports 2, 3. By ensuring that the radius of the center wheels 8 is larger than the radius of the wheels 7, a user is better able to push the dolly 1 over a threshold 15 and thereby onto a flooring 16 having a higher altitude than a second flooring 17 on which a user stands and from which the user pushes the dolly 1. This benefit is generated because the greater the radius of a wheel (while keeping mass constant), the less the torque required to rotate the wheel over a bump. Moreover, a reduction in torque, in turn, reduces the force which a user must apply to the dolly 1 to push it over a threshold 15.

As greater wheel radii reduce the torque necessary to push the dolly 1, the easier it is for users of small stature to fully use the dolly 1 and thereby perform their duties. However, an increase in wheel radius is not the only way in which the currently described dolly 1 serves to reduce the force necessary to push the dolly 1 over a threshold.

The dolly 1 also has the ability to flex or pivot along the axis of rotation defined by the bar 9. The flexing nature of the dolly 1 is generated by the hinge 4. Accordingly, because the dolly 1 flexes along the hinge 4, the user must only provide enough force to push the one support (carrying a container) over the threshold 15 at a time. In another words, when a user encounters a threshold 15, the force which must be applied is time dependent. The force immediately necessary corresponds mainly to the weight supported by the support 2 nearest the threshold 15. As shown in FIG. 4A, after a support 2 and its container 20 are pushed over a threshold 15, the weight contained in that container 20 is then fully supported by the flooring 16 at the higher altitude. This is so because the hinge 4 bends (in an angle shown at A) toward the flooring 17 on which the user stands so that the wheels 7 of the leading support 2 fully contact the flooring 16 while the wheels 7 of the trailing support 3, along with the center wheels 8, remain in contact with the flooring 17.

As the user continues to push the dolly 1, the center wheels 8 easily roll over the threshold 15 due to their large radius. As shown in FIG. 4B, at this point, the hinge 4 is bent in the opposite direction so that the trailing support 3 remains in contact with the flooring 17 on which it rests. The magnitude to which the hinge bends in FIG. 4B (as shown as angle A) is the same as the magnitude to which the hinge bends in FIG. 4A but it is in the opposite direction. In addition, when the user pushes the second support 3 over the threshold 15, the force necessary corresponds mainly to the weight in the container 21 supported by that second support 3.

Figure 5A:
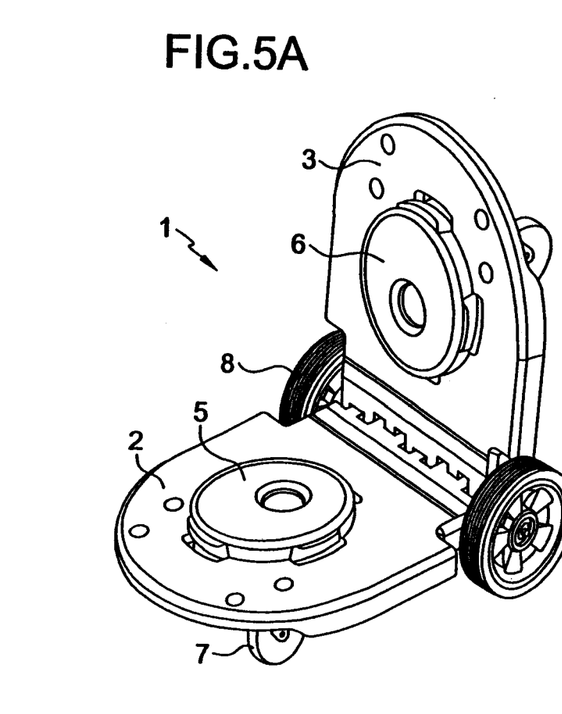
FIG. 5A is a topside perspective view of a dolly according to the present invention showing how one support platform can be rotated to an angle which is approximately vertical with respect to the other horizontal support platform and FIG. 5B shows how one container can be nested in another container which is attached to the dolly for storage purposes.
Figure 5B:
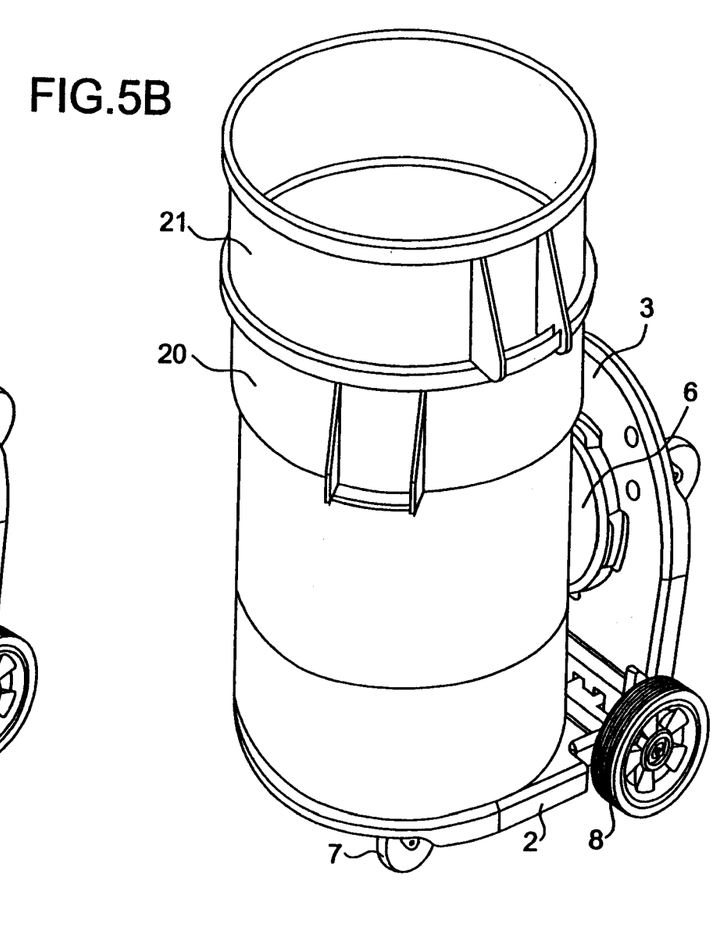

As shown in FIG. 5A, the hinge 4 is also capable of bending so that the support mechanism 6 of one support 3 moves closer to the support mechanism 5 of the other support 2. In a preferred embodiment, one support 3 can be rotated toward the other support 2 (by means of the hinge 4) to the point at which the support 3 being rotated is at an angle between 75° and 105° with respect to the support 2 which remains on the ground. As shown in FIG. 5B, a user may chose to remove a container 21 which is attached to a support 3 and nest it in the container 20 attached to the other support 2. With the containers 20, 21 nested, the user can rotate the support 3 which lacks a container to an angle between 75° and 105° with respect to the other support 2 and then roll the dolly 1 into a closet or other storage location. Accordingly, the floor space necessary to store the dolly 1 is reduced by almost 50%.

Figure 6:
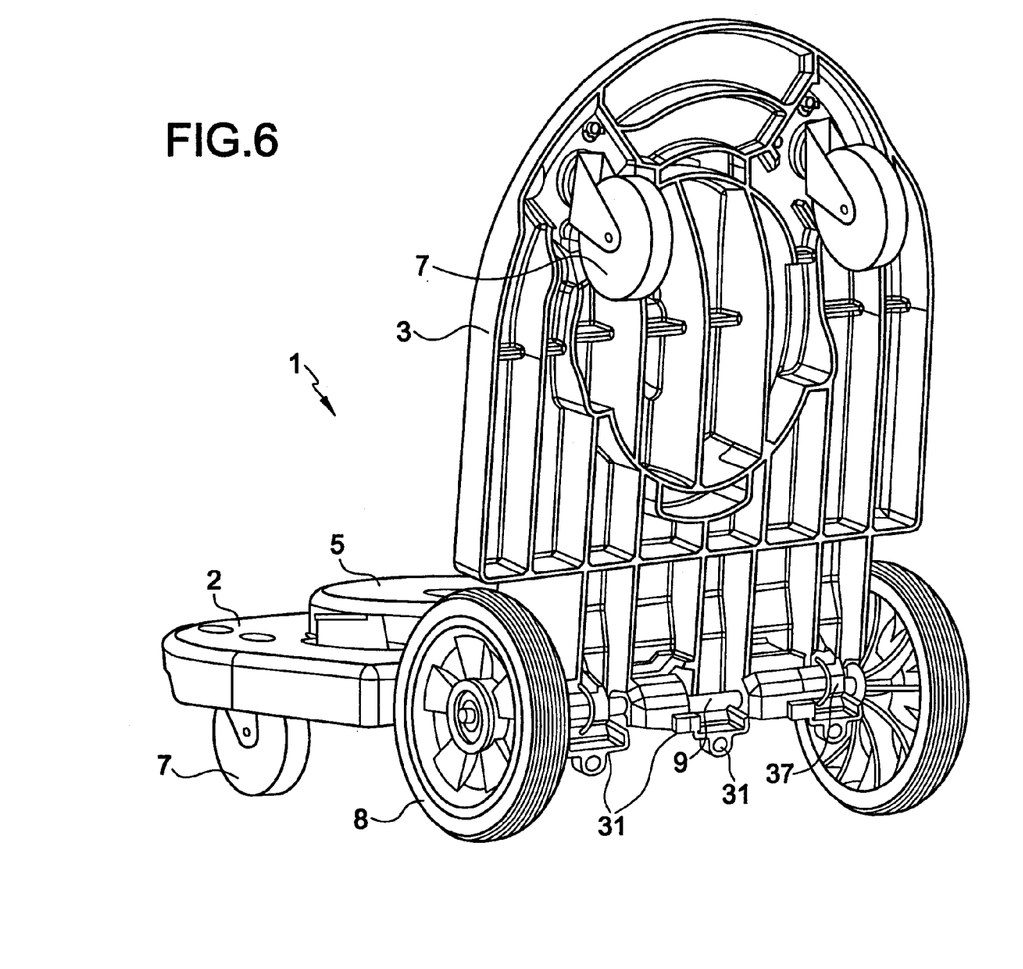
FIG. 6 is a perspective view of the dolly showing the hinge lock.

It is also possible, and indeed is preferable, to temporarily lock the support 3 rotated to the angle between 75° and 105°. As shown in FIGS. 1 and 6, a hinge locking mechanism can be incorporated along the hinge 4. The hinge 4 is preferably defined by a plurality of fingers 31; ideally, each support 2, 3 has three fingers 31. Each finger 31 comprises two top beams 36 and one bottom beam 37 which circumscribe the bar 9; in other words, the bar 9 is journalled through the top and bottom beams. Between the top beams 36, and above the bar 9, is formed is space 38 the functionality of which is hereafter described. Between each finger 31 is support portion 32.

When the supports 2, 3 are hinged together each finger 31 on one support 2, 3 is aligned with a support portion 32 on the other support. The hinge locking mechanism incorporates a space-entering block 33 which is formed onto the support portion 32 closest to one side 35 of a support 2, 3; the space-entering block 33 is attached to the post in the direction of the bar 9. When one support 3 is rotated toward the other support 2, the space-entering block 33 on the support 3 being rotated rides up on the corresponding finger 31 of the other support 2 and then falls into the space 38 formed in that finger 31. As another block, i.e., a, finger-engaging or tilting block 39, rides up on the corresponding finger 31, the support 3 being rotated is slightly tilted with respect to the bar 9 (as shown in FIG. 6). In other words, the side 34 of the support 3 away from the tilting block 39 is tilted close to the corresponding center wheel 8 whereas the other side 35 of the support 3 (near the tilting block 39) is pushed away from its corresponding center wheel 8 by the tilting block 39.

Tilting the rotated support 3 in this fashion provides the contact area necessary to provide sufficient friction to prevent the support 3 from falling naturally, under the force of gravity, back to the ground. To return the support 3 (which was rotated and temporarily locked at an angle between 75° and 105°) to the ground, the user need only to slightly lift the support 3 so that the block 33 leaves the space 38; lifting the support 3 in this fashion eliminates the contact between the block 33 of the support 3 and the corresponding space 38 of the other support 2. When the contact area is eliminated, pushing the support 3 toward the ground will cause the support 3 to fall naturally (under the force of gravity) to the ground.

Figure 7:
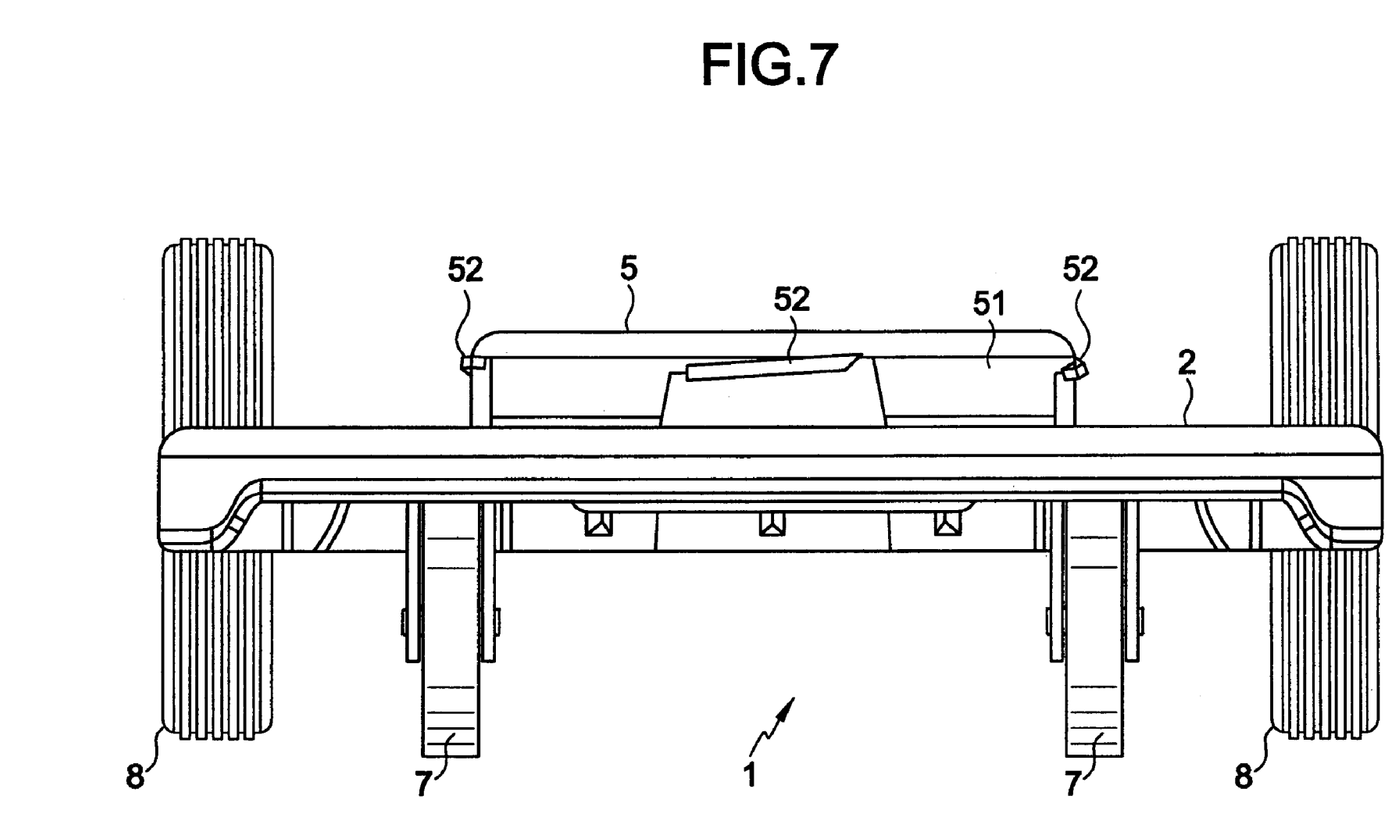
FIG. 7 is an end view of the dolly showing the support mechanism of one of the supports.

Containers of various sizes can be attached to the supports 2, 3 by a number of different support mechanisms. A preferred support mechanism 5, 6 is shown in FIGS. 1 and 7. As shown in FIG. 7, a cylindrical boss 51 extends upwardly from the top surface 12 of the dolly 1, and is provided with external (i.e., male) screw threads 52.

Figure 8:
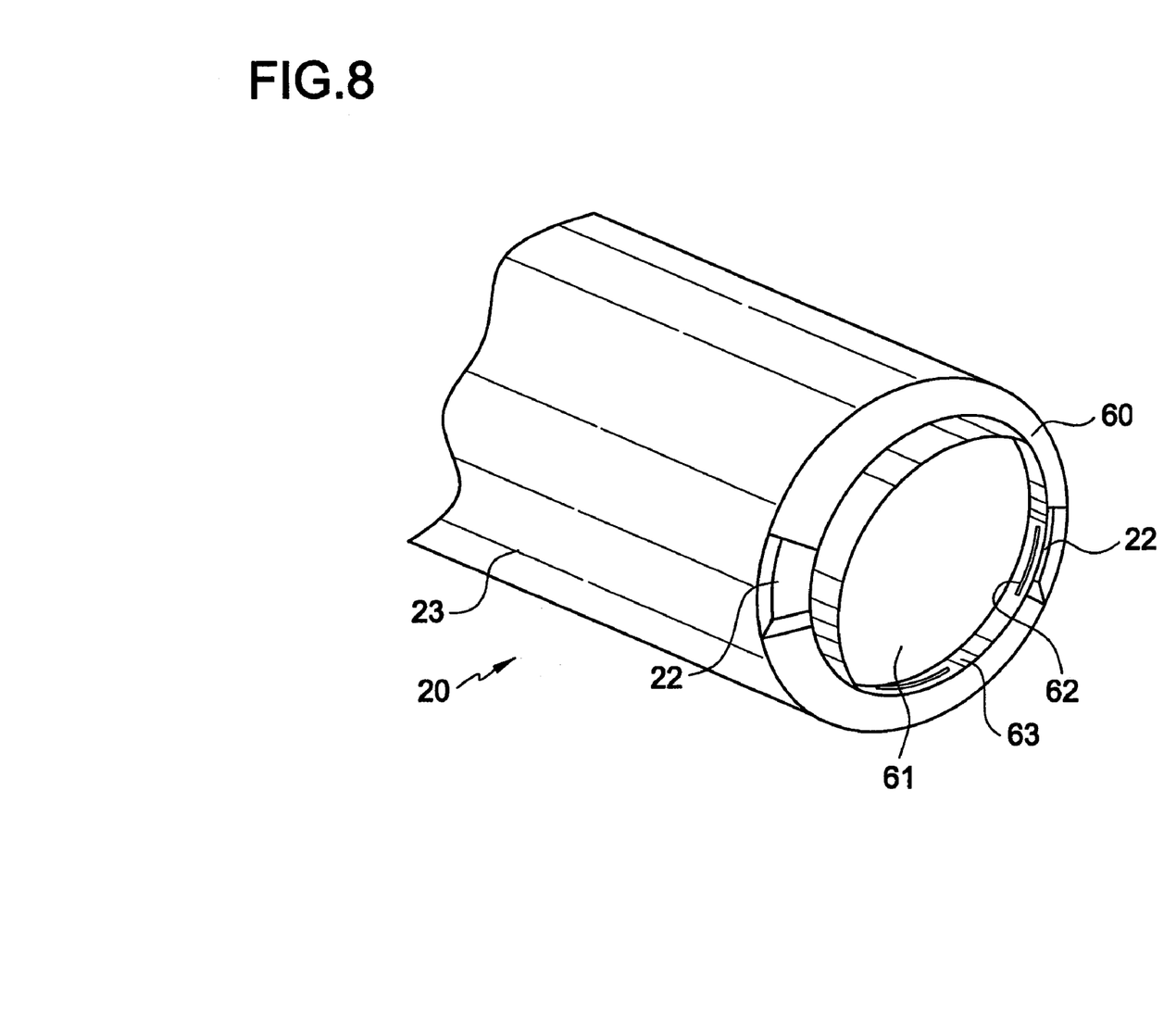
FIG. 8 is a perspective view showing an underside of a container designed to engage an support mechanism on the dolly.

The support mechanisms 5, 6 are ideally designed to engage containers 20, 21 hereafter described. Although the following describes the relationship between one container 20 and one support mechanism 5 of the dolly 1, it is to be understood that the second container 21 engages the second support mechanism 6 in the same fashion. The upstanding walls 23 of a container 20 are preferably circular in shape. The bottom surface 60 of the container 20 has a central region which is circular in shape. In addition, the bottom surface 60 preferably has a pair of opposing grip recesses 22 formed therein to allow a user to lift a the container 20 easily when it is not attached to the dolly 1. A centrally disposed cylindrical socket 61 extends into the bottom surface 60 as shown in FIG. 8. The socket 61 includes internal (i.e., female) screw threads 62 integrally formed from socket side walls 63. The socket side walls 63 have a top edge which is generally coplanar with the bottom surface 60 of the container 20.

Engagement of the container 20 to the support mechanism 5 is as follows. As will be appreciated from FIGS. 8 and 9, the dolly 1 is attached by screwing external screw threads 52 into the internal screw threads 62 of the socket 61 of the container 20. The cylindrical boss 51 of the support mechanism 5 is inserted into the socket 61 and a rotation of the container 20 relative to the dolly 1 initiates the screw threaded support. At this point, rotational movement between the dolly 1 and the container 20 is terminated, and the dolly 1 is rigidly affixed to the underside of the container 20 by screw threaded support.

Many obvious alterations can be made to the invention herein described. For example, the hinge can be formed to allow one support to bend 180° onto the other support to reduce shipping costs or to make it easier for a user to carry the dolly when no containers are attached thereto. In addition, although the dolly has been described as having two casters under each support, the number of casters (and their location) is largely a matter of user preference. Moreover, casters could be used as center wheels. It is also possible to provide a different: (a) support mechanism for engaging containers to the support; (b) lock for temporarily maintaining one support at an angle between 75° and 105° with respect to the other; or (c) step lock brake mechanism by which movement of the dolly may be temporarily prevented.

Although the aforementioned described a preferred embodiment of the invention, the invention is not so restricted. The foregoing description is for exemplary purposes only and is not intended to be limiting. Accordingly, alternatives which would be obvious to one of ordinary skill in the art upon reading the teachings herein disclosed, are hereby within the scope of this invention. The invention is limited only as defined in the following claims and equivalents thereof.

What is claimed is:

1. A locking mechanism for use on a dolly which carries multiple containers, said locking mechanism comprising:
   a first hinge portion having a plurality of first fingers, each having at least one top beam and at least one bottom beam defining a plurality of first spaces, and a plurality of first support portions;
   a second hinge portion having a plurality of second fingers, each having at least one top beam and at least one bottom beam defining a plurality of second spaces, and a plurality of second support portions;
   a block attached to one of said first support portions; and
   a bar journalled through the first fingers and through the second fingers thereby joining the first hinge portion and the second hinge portion,
   wherein at least one of the first fingers is fixedly engaged with at least one of the second support portions when the block is positioned in one of said second spaces.

2. The locking mechanism according to claim 1, wherein the first support portion to which the block is attached is at an end of the first hinge portion.

3. A locking mechanism for use on a dolly which carries multiple containers, said locking mechanism comprising:
   a first hinge portion having a plurality of first fingers, each having at least one top beam and at least one bottom beam defining a plurality of first spaces, and a plurality of first support portions;
   a second hinge portion having a plurality of second fingers, each having at least one top beam and at least one bottom beam defining a plurality of second spaces, and a plurality of second support portions;
   a block attached to one of said first support portions; and
   a bar journalled through the first fingers and through the second fingers thereby joining the first hinge portion and the second hinge portion,
   wherein at least one of the first fingers is fixedly engaged with at least one of the second support portions when the block is positioned in one of said second spaces, wherein the first support portion to which the block is attached is at an end of the first hinge portion, and wherein when the first hinge portion is rotated with respect to the second hinge portion, the block becomes frictionally engaged with one of said second fingers.

4. A locking mechanism for connecting two supports of a dolly, said locking mechanism comprising:
   a first hinge portion having a plurality of first fingers and a plurality of first support portions, wherein at least one of said first support portions includes a space-entering block extending from the first support portion;
   a second hinge portion having a plurality of second fingers, at least one of which defines a space; and
   a bar extending through the first fingers and the second fingers, thereby joining the first hinge portion and the second hinge portion,
   wherein, when said first hinge portion is rotated with respect to said second hinge portion, said space-entering block enters said space thereby releasably fixing the orientation of said first hinge portion with respect to said second hinge portion.

5. The locking mechanism according to claim 4, wherein the first support portion including the space-entering block extending therefrom is at a first end of the first hinge portion.

6. The locking mechanism according to claim 4, wherein said first hinge portion comprises an additional space-entering block which is adapted to fit within a second space defined by one of the second fingers of the second hinge portion when said first hinge portion is rotated with respect to said second hinge portion.

7. The locking mechanism according to claim 4, wherein the second hinge portion has a plurality of second support portions, wherein at least one of said second support portions includes a space-entering block extending therefrom, and wherein at least one of the first plurality of fingers defines a space,
   wherein, when said second hinge portion is rotated with respect to said first hinge portion, said space-entering block extending from said one of said second support portions enters said space defined by said one of the plurality of first fingers, thereby releasably fixing the orientation of said second hinge portion with respect to said first hinge portion.

8. The locking mechanism according to claim 7, wherein the second hinge portion has the same configuration as the first hinge portion.

9. A locking mechanism for connecting two supports of a dolly, said locking mechanism comprising:
   a first hinge portion having a plurality of first fingers and a plurality of first support portions, wherein at least one of said first support portions includes a space-entering block extending from the first support portion;
   a second hinge portion having a plurality of second fingers, at least one of which defines a space; and
   a bar extending through the first fingers and the second fingers, thereby joining the first hinge portion and the second hinge portion,
   wherein, when said first hinge portion is rotated with respect to said second hinge portion, said space-entering block enters said space thereby releasably fixing the orientation of said first hinge portion with respect to said second hinge portion, wherein the first support portion including the space-entering block extending therefrom is at a first end of the first hinge portion, and wherein a tilting block, extending from a first support portion located at a second end of the first hinge portion, causes the first hinge portion to be tilted with respect to the second hinge portion when the first hinge portion is rotated with respect to the second hinge portion.

* * * * *